US012668371B2

(12) United States Patent
Elbibary et al.

(10) Patent No.: US 12,668,371 B2
(45) Date of Patent: Jun. 30, 2026

(54) AEROSPACE TURBOMACHINE ADAPTIVE MACHINE LEARNING CONTROLS WITH HEALTH MONITORING CAPABILITY

(71) Applicant: The Boeing Company, Arlington, VA (US)

(72) Inventors: Mohamed Elbibary, Millcreek, WA (US); Daniel Merle Newman, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 174 days.

(21) Appl. No.: 18/521,753

(22) Filed: Nov. 28, 2023

(65) Prior Publication Data

US 2025/0171156 A1      May 29, 2025

(51) Int. Cl.
*B64D 31/16*          (2024.01)
*B64F 5/60*           (2017.01)
*G01M 15/14*          (2006.01)

(52) U.S. Cl.
CPC ................ *B64D 31/16* (2024.01); *B64F 5/60* (2017.01); *G01M 15/14* (2013.01)

(58) Field of Classification Search
CPC ........... B64D 31/16; B64F 5/60; G01M 15/14
USPC .......................................................... 701/99
See application file for complete search history.

(56) References Cited

U.S. PATENT DOCUMENTS

| | | | |
|---|---|---|---|
| 5,309,379 A | 5/1994 | Rawlings et al. | |
| 7,027,953 B2 | 4/2006 | Klein | |
| 8,655,571 B2 | 2/2014 | Geib et al. | |
| 8,676,436 B2 | 3/2014 | Raimarckers et al. | |
| 8,918,264 B2 | 12/2014 | Jegu et al. | |
| 9,797,328 B2 | 10/2017 | Martinez et al. | |
| 10,678,969 B2 | 6/2020 | Stevens et al. | |
| 10,823,076 B2 | 11/2020 | Pilon et al. | |
| 10,941,707 B1 * | 3/2021 | Berkey | B64D 27/33 |
| 11,694,101 B1 | 7/2023 | Xu et al. | |
| 2005/0096873 A1 | 5/2005 | Klein | |
| 2012/0128468 A1* | 5/2012 | Schleif | F01D 21/12 |
| | | | 415/118 |
| 2012/0130617 A1 | 5/2012 | Raimarckers et al. | |
| 2012/0316748 A1 | 12/2012 | Jegu et al. | |

(Continued)

FOREIGN PATENT DOCUMENTS

| | | | |
|---|---|---|---|
| CN | 112329337 A | 2/2021 | |
| FR | 2947335 A1 | 12/2010 | |
| WO | WO-2021-094667 | * | 5/2021 |

OTHER PUBLICATIONS

Extended European search report mailed Mar. 3, 2025 for corresponding Application No. 24213393.2-1004 (14 pages).

*Primary Examiner* — Muhammad Shafi
(74) *Attorney, Agent, or Firm* — Joseph M. Butscher; Carroll, Hoette & Butscher, LLC

(57) ABSTRACT

A turbomachine monitoring and control system includes a temperature sensor configured to measure temperature of a turbomachine disposed onboard a vehicle, a vibration sensor configured to measure vibration of the turbomachine, and a controller including one or more processors. The controller is configured to receive and analyze temperature data generated by the temperature sensor and vibration data generated by the vibration sensor. The controller is further configured to determine a health condition of the turbomachine based on the analysis.

20 Claims, 4 Drawing Sheets

(56)  References Cited

U.S. PATENT DOCUMENTS

| 2012/0330495 | A1  | 12/2012 | Geib et al. | |
|---|---|---|---|---|
| 2014/0244051 | A1  | 8/2014 | Rollins | |
| 2015/0322813 | A1  | 11/2015 | Tralshawala | |
| 2016/0177856 | A1  | 6/2016 | Martinez et al. | |
| 2016/0341043 | A1* | 11/2016 | Li | F01D 5/005 |
| 2018/0307784 | A1  | 10/2018 | Stevens et al. | |
| 2019/0003396 | A1  | 1/2019 | Pilon et al. | |
| 2019/0041841 | A1  | 2/2019 | Cella | |
| 2019/0146000 | A1* | 5/2019 | Hurst | G01P 21/02 |
| | | | | 702/144 |
| 2020/0381985 | A1* | 12/2020 | Sercombe | H02K 5/225 |
| 2020/0408106 | A1  | 12/2020 | Karnofski et al. | |
| 2020/0409653 | A1  | 12/2020 | Das et al. | |
| 2023/0391458 | A1* | 12/2023 | Sanchez | B64D 13/02 |

* cited by examiner

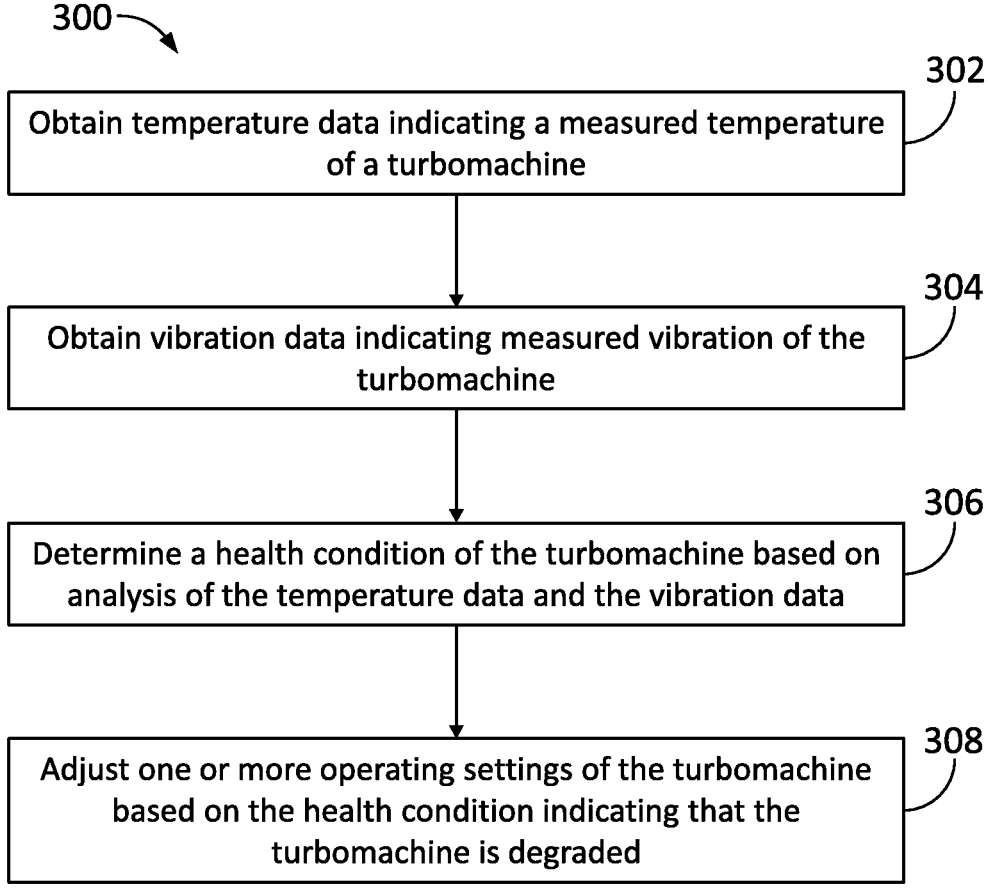

300

302

Obtain temperature data indicating a measured temperature of a turbomachine

304

Obtain vibration data indicating measured vibration of the turbomachine

306

Determine a health condition of the turbomachine based on analysis of the temperature data and the vibration data

308

Adjust one or more operating settings of the turbomachine based on the health condition indicating that the turbomachine is degraded

FIG. 3

AEROSPACE TURBOMACHINE ADAPTIVE MACHINE LEARNING CONTROLS WITH HEALTH MONITORING CAPABILITY

FIELD OF THE DISCLOSURE

Embodiments of the present disclosure generally relate to monitoring and controlling the operation of turbomachinery on vehicles, such as aircraft.

BACKGROUND

Some vehicles include turbomachinery that includes a rotor (e.g., impeller or turbine) which performs work on a fluid or extracts energy from a fluid. Some turbomachines include compressors, fans, blowers, and the like that perform work on a gas passing through the turbomachine to increase the gas pressure. For example, an aircraft may include one or more air compressors for providing cabin pressurization, conditioning air for passengers and crew, and/or the like. In some turbomachines, the rotation of the impeller is driven by an electric motor. Electrically-driven compressors and other turbomachines may be more efficient than traditional pneumatic turbomachines that are powered by engine bleed air. For example, the motors have adjustable speeds to operate the compressors or other turbomachinery at desired pressures and rotor speeds without significant energy waste.

However, turbomachinery components are prone to experiencing failures and degraded operation prior than antici-pated. For example, thermal load on the motor windings may degrade the winding insulation, which can cause the motor to fail due to overheating. A degraded motor may experience electrical shorts between motor phases. In another example, failure may be caused by eccentric rotation of an impeller. At startup and other transient operating states, the impeller rotational speed is low and no boundary layer may be present to sustain air journal bearings that suspend the impeller. At these states, the mechanical impedance may be relatively high, which contributes to component degra-dation (e.g., wear).

Due to the complex machinery, it is difficult to predict the end of life and to monitor degradation of the turbomachin-ery. The operating conditions may significantly vary from one operator to another, which sets a challenge for tradi-tional proportional-integral-derivative (PID) controllers to operate those turbomachines on an adequate performance map due to constant gains that are adjusted for a certain design margin. In addition, the rate of degradation of the units is variable. Once the PID controller has reached its limit, no more gains may be applied. The controller may reach its bandwidth leading to degraded performance over time. The degraded performance may expedite the degrada-tion of the units as the units are controlled according to constant performance maps that are established for new units with no degraded parts. PID controllers may struggle to protect the turbomachine from surge events once the machine starts to deteriorate. As such, an operator may not be able to provide remedial maintenance when needed to extend the operational life of the machinery. Some known systems may not adequately monitor the condition or health of installed turbomachinery. Some known systems may be limited to tracking cyclic data, such as counting contactor cycles, and comparing the tracked cyclic data to a designated limit (e.g., cycle limit) that is associated with an expected end of life. Health determinations made based on cyclic data alone, such as contactor cycles, may not be accurate at predicting the end of life of a turbomachinery component because such health determinations are generic and do not account for specific characteristics and conditions of the actual components being monitored. As a result of such poor, non-individualized monitoring, turbomachinery fail-ures are common in the field. Such failures can result in delays (e.g., travel delays), an increased number of unsched-uled maintenance events, increased part costs to due to part replacements and collateral damage to nearby parts, and/or the like.

SUMMARY OF THE DISCLOSURE

A need exists for a system and method that adaptively controls and monitors operating turbomachinery in a vehicle and diagnoses a health condition of the turbomachinery. Based on the diagnosed health condition, the system and method may perform one or more appropriate actions to extend the lifetime of the turbomachinery, enhance control and/or performance of the turbomachinery, limit delay caused by replacing or repairing the turbomachinery, and/or the like.

Certain embodiments of the present disclosure provide a monitoring and control system that includes a temperature sensor configured to measure temperature of a turbomachine disposed onboard a vehicle, a vibration sensor configured to measure vibration of the turbomachine, and a controller including one or more processors. The controller is config-ured to receive and analyze temperature data generated by the temperature sensor and vibration data generated by the vibration sensor. The controller is further configured with an adaptive controls algorithm to determine a health condition of the turbomachine based on the analysis. For example, the controller may determine the health condition based on analysis of the data captured in the controller memory. The controller may then calculate a modified performance map and new gains based on the condition of the turbomachine.

Certain embodiments of the present disclosure provide a method of monitoring and controlling a turbomachine. The method includes obtaining temperature data generated by a temperature sensor indicating a measured temperature of a turbomachine disposed onboard a vehicle, and obtaining vibration data generated by a vibration sensor indicating a measured vibration of the turbomachine. The method includes determining a health condition of the turbomachine based on an analysis of the temperature data, the vibration data, operating envelope of the aircraft, and/or variable systems loads per flight (unique per aircraft). The controller may determine the mean time between failures (MTBF) based on this information using the adaptive controls algo-rithm.

As the turbomachine components mature in life and start to degrade, the PID controller gains reaches limits and may not be able to drive the turbomachine along its original performance map. The turbomachine may undesirably expe-rience more frequent deep surges leading to more harmful effects on the turbomachine. Recovering from those surges may be difficult, leading to shutdown of the turbomachine. Some systems may rely on compressors to provide air conditioning and cabin pressurization. A shutdown occur-ring on such systems could represent a serious hazard unless remedial action is taken. The proposed adaptive control algorithm ensures that the turbomachine is driven with the available operational margins based on the turbomachine component's health and a re-calculated performance map.

Certain embodiments of the present disclosure provide an aircraft that includes a turbomachine installed onboard the aircraft and a monitoring and control system disposed onboard the aircraft. The turbomachine includes a rotor that is configured to compress air and an electric motor that is configured to drive rotation of the rotor. The monitoring and control system includes a temperature sensor configured to measure temperature of a turbomachine disposed onboard a vehicle, a vibration sensor configured to measure vibration of the turbomachine, and a controller including one or more processors. The controller is configured to receive and analyze temperature data generated by the temperature sensor and vibration data generated by the vibration sensor. The controller is further configured to determine a health condition of the turbomachine based on the analysis.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 3 is a flow chart of a method of monitoring and controlling a turbomachine according to an embodiment.

DETAILED DESCRIPTION OF THE DISCLOSURE

Figure 1:
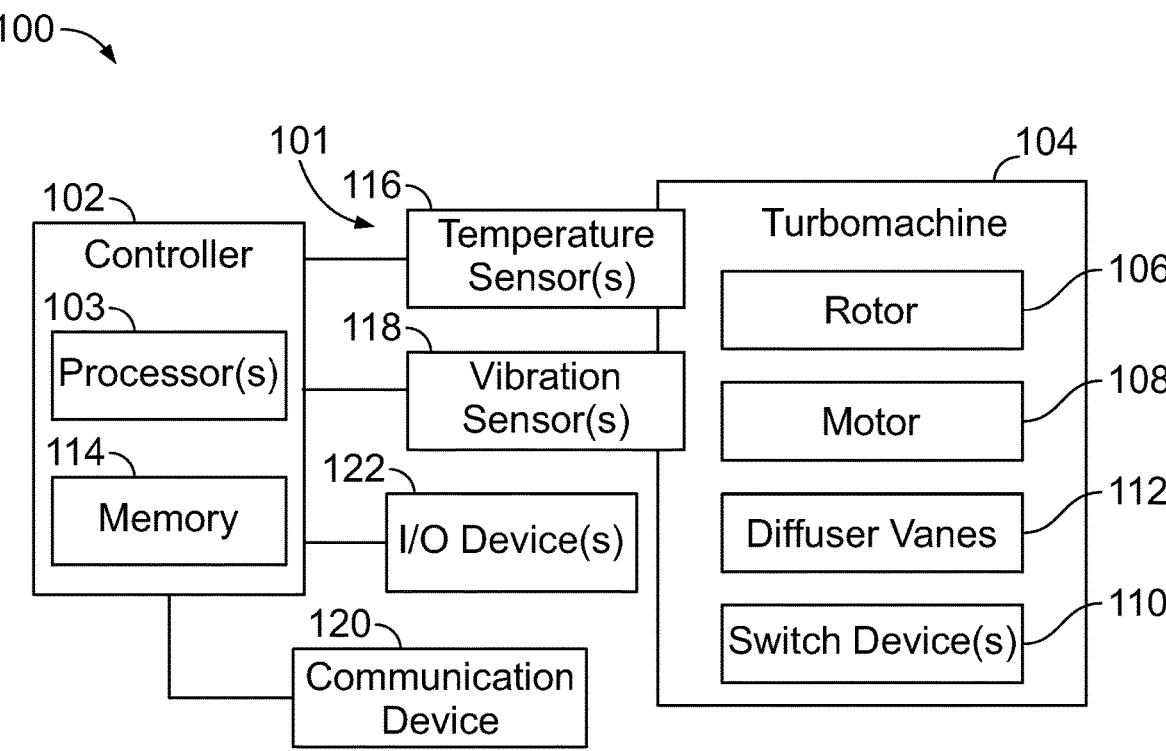
FIG. 1 is a block diagram of a turbomachine monitoring and control system according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a turbomachine monitoring and control system. The monitoring and control system may be implemented on a vehicle, such an aircraft. The monitoring and control system uses parameters measured and/or derived from sensor data to determine a condition of a turbomachine, or component thereof. The condition represents a health condition of the turbomachine. The health condition may indicate an extent of degradation of the turbomachine. The monitoring and control system optionally may determine a predicted remaining life of the turbomachine, or component thereof, based on the condition. In an example, the turbomachine monitoring and control system may determine the condition of the turbomachine as a periodic health check. For example, the system may perform a health check prior to each scheduled trip of the vehicle on which the turbomachine is installed.

In an embodiment, the turbomachine monitoring and control system may control the vehicle and/or the turbomachinery based on the condition that is determined. For example, the system may adjust operating settings (e.g., power settings, positional settings of diffuser vanes, valves, switch devices, etc.), change a performance curve to implement, and/or the like based on the condition. Some of the control changes may be made to enhance and/or maintain a desired level of performance of the turbomachinery. For example, power to a compressor motor may be increased and/or diffuser vanes may be moved a greater extent when the turbomachinery is determined to be degraded to compensate for the degraded condition and attempt to maintain the same or similar performance of the turbomachinery relative to when the turbomachinery was new. Optionally, the system may implement control changes in an attempt to reduce a rate of wear or degradation of the turbomachinery and extend the operational lifetime of a degraded turbomachine. For example, in response to determining that the turbomachine is degraded, the system may restrict or limit operation of the vehicle and/or the turbomachine during a trip. The system may also perform one or more remedial actions based on the condition. In an example, the system may schedule preventative maintenance for the turbomachine prior to the turbomachine experiencing catastrophic failure.

The turbomachine monitoring and control system described herein may have several beneficial technical effects. The system may provide accurate prediction of turbomachinery health on a periodic and/or on-demand basis, without requiring active participation by an operator. The system may improve vehicle reliability and turbomachinery control by reducing the risk of unexpected instances of component failures and/or decreased performance. For example, the system may adjust settings of the turbomachine to compensate for decreased or diminished performance of the turbomachine. The system can notify operators about suggested preventative maintenance prior to components failing, which can extend the lifetime of the turbomachinery components and reduce collateral damage caused by catastrophic failures. Extending the operational lifetime of the turbomachinery components may reduce costs attributable to part replacements, as parts are replaced less frequently. The system may also enable predicting supply chain demands and availability of spare parts that will be needed. As a result, once a component reaches the end of its operational life, the replacement part may be present at the service facility to limit the vehicle downtime and get the vehicle back in service in a timely manner.

In one or more examples described herein, the vehicle that includes the turbomachinery is an aircraft. The aircraft may be a commercial passenger aircraft. The monitoring and control system may also be implemented in other types of aircraft and even non-aircraft vehicles. Other types of aircraft may include electric aircraft, autonomous aircraft, and/or the like. Other suitable types of vehicles for the monitoring and control system may include rail vehicles (e.g., locomotives), automobiles, trucks, buses, mining vehicles, agricultural vehicles, and the like.

Referring now to the drawings, FIG. 1 is a block diagram of a turbomachine monitoring and control system 100. The monitoring and control system 100 can monitor a turbomachine 104 of a vehicle. The monitoring and control system 100 includes one or more sensors 101 and a controller 102 that has one or more processors 103. The turbomachine 104 is a device that exchanges energy between a rotor 106 of the turbomachine 104 and a fluid. Examples of the turbomachine 104 may include a compressor, a blower, a pump, a fan, a turbine, or the like. In an example, the turbomachine 104 includes a rotor 106 that is driven by a motor 108. The motor 108 may be an electric motor that is powered by electric current. The motor 108 may drive rotation of an impeller, which represents the rotor 106, to compress air. In an example application, the turbomachine 104 is a cabin air compressor (CAC) disposed onboard an aircraft. The CAC produces compressed air by receiving ram air via cabin air inlets and electrically powering rotation of the impeller of the CAC, via the motor 108, to compress the ram air to a designated pressure.

The turbomachine 104 can include multiple components, such as the rotor 106 (e.g., impeller, turbine, etc.), a housing that holds the rotor 106, bearings, the motor 108, one or more switch devices 110, diffuser vanes 112, valves, air ducts and manifolds, and/or the like. The one or more switch devices 110 may control electrical power to the motor 108. For example, the one or more switch devices 110 may be actuated to selectively open and close a conductive pathway from a power source to the motor 108. The power source may be an electrical energy storage device (e.g., battery), an electrical circuit (e.g., power bus) onboard the vehicle, or the like. The one or more switch devices 110 may be contactors (e.g., relays) or other mechanical switches, solid state relays, and/or semiconductor electronic switches. The diffuser vanes 112 control the direction of airflow through the turbomachine 104. For example, diffuser vanes 112 may control the angle of attack of compressed air exiting the compressor. The diffuser vanes 112 are selectively positioned by the controller 102 to redirect the airflow. In an example, the controller 102 may actuate the diffuser vanes 112 to provide surge protection for reducing the risk of the rotor 106 experiencing a dangerous surge condition. FIG. 1 only shows a subset of the components of the turbomachine 104.

The components of the turbomachine 104 may degrade and fail at unanticipated times prior to the expected end of life for the corresponding component. The sensors 101 can monitor one or more parameters of the turbomachine 104. The sensors 101 can generate sensor signals that are received and analyzed by the controller 102. The sensor signals may be affected by the state or condition of the components of the turbomachine 104. For example, an electrical characteristic of the sensor signal (e.g., voltage, current, phase, etc.) may vary based on the condition of a component that is monitored by the sensor, such as a temperature, resistance, rotation speed, vibration, proximity, and/or the like.

The controller 102 may determine a condition of the turbomachine 104 based on analysis of the monitored parameters. In an example, the controller 102 may characterize the condition as a binary selection between healthy (e.g., productive and unimpaired) or unhealthy (e.g., degraded, deteriorated, failed, and/or diminished operation). Alternatively, the controller 102 may characterize the condition as a value along a scale, such as integers from one to ten. The condition may be used to plan preventative maintenance to avoid unexpected failures and/or diminished performance of the turbomachine 104. For example, the condition may be used to predict the remaining life of the turbomachine 104, or a component thereof. The predicted remaining life may refer to an amount of time, a number of operating cycles or operating events remaining, or a percentage value indicating an amount of life remaining relative to a full operational lifetime (e.g., as specified by the manufacturer of the component).

Determining the condition of the turbomachine 104 can allow the monitoring and control system 100 to recommend and/or schedule preventative maintenance prior to component failure while it is convenient for the maintenance work to occur. The preventative maintenance work may improve reliability by avoiding or reducing delays and damage attributable to failures of the turbomachine 104, such as compressor failure. Furthermore, the controller 102 may control and modify operation of the turbomachine 104, or at least suggest control settings to an operator, during a trip of the vehicle based on the condition that is determined. For example, upon determining that the turbomachine 104 has a degraded condition, the controller 102 may adjust one or more control settings for the turbomachine 104 relative to the control settings implemented while the turbomachine 104 has a healthier condition. The control settings may be adjusted to compensate for the diminished performance of the turbomachine 104. Optionally, if the condition indicates a risk of failure, the controller 102 may avoid or restrict operations of the turbomachine 104 to reduce the load on the turbomachine 104 and reduce the risk of failure, until maintenance can be performed. In an example in which the turbomachine 104 is a compressor that compresses air for cabin pressurization and/or air conditioning within the cabin, the controller 102 may deactivate the compressor, such as by blocking electric current to the motor 108. The controller 102 may control another compressor onboard the vehicle to compress more air to compensate for the deactivated compressor. Additional examples of control operations are provided herein.

The controller 102 may represent hardware circuitry that includes or is connected with the one or more processors 103. The one or more processors 103 can be microprocessors, integrated circuits, microcontrollers, field-programmable gate arrays, etc. The one or more processors 103 may be connected with a tangible and non-transitory computer-readable storage medium (e.g., data storage device, computer memory, etc.), referred to herein as memory 114. The memory 114 stores program instructions (e.g., software) that are executed by the one or more processors 103 to perform various operations described herein. For example, the one or more processors 103 may execute the program instructions stored in the memory 114 to determine a condition of the turbomachine 104, or a component thereof, based on monitored parameters. The one or more processors 103 may also execute the program instructions to perform one or more remedial or output tasks based on the condition as determined. For example, the one or more processors 103 may generate a recommendation message and/or control signals for controlling one or more systems onboard the vehicle based on the condition as determined. The recommendation message and/or control signals may be generated to adjust operation of the turbomachine 104 as the turbomachine 104 ages to enhance performance of the turbomachine 104 and/or extend the life of the turbomachine 104.

The sensors 101 of the monitoring and control system 100 may include one or more electric current sensors, electric voltage sensors, temperature sensors, proximity sensors, vibration sensors, and/or the like. In the illustrated embodiment, the sensors 101 include one or more temperature sensors 116 and one or more vibration sensors 118. The one or more temperature sensors 116 may be thermocouples, thermistors, resistance temperature detectors (RTDs), and/or semiconductor-based integrated sensors, that measure a temperature of the turbomachine 104. The one or more vibration sensors 118 may be accelerometers, laser displacement sensors, gyroscopes, and/or pressure sensors that measure vibration of the turbomachine 104. The temperature and vibration sensors 116, 118 may generate sensor signals indicative of the respective measured parameter. The controller 102 may be communicatively connected to the sensors 101 via wired and/or wireless communication pathways. For example, the controller 102 may receive the sensor signals generated by the one or more temperature sensors 116 via a wired (e.g., electrically conductive) pathway. The controller 102 may analyze the sensor signals generated by the sensors 101 to monitor the one or more parameters of the turbomachine 104.

The monitoring and control system 100 may include a communication device 120 that is communicatively connected to the controller 102 via a wired or wireless communication pathway. The communication device 120 may enable the controller 102 to communicate with a vehicle control system and/or a display device onboard the vehicle, with an off-board control device or server, or the like. The communication device 120 represents hardware circuitry that can communicate electrical signals via wireless communication pathways and/or wired conductive pathways. The communication device 120 may include transceiving circuitry (e.g., a transceiver or separate transmitter and receiver), one or more antennas, and the like, for wireless communication. Alternatively, the communication device 120 may communicate with the vehicle control system and/or display device via a communication cable. The communication cable may be an ethernet cable, a coaxial cable, an optical cable, or the like.

The monitoring and control system 100 optionally includes one or more input devices and/or output devices, collectively referred to herein as I/O devices 122. Suitable I/O devices 122 may include a display device, physical buttons, touchscreens, microphones, audio speakers, and/or the like. The display device may present graphical information, such as a graphical user interface (GUI), images, videos, text-based messages (e.g., emails), and/or the like.

The monitoring and control system 100 optionally may include a housing the collectively contains components of the monitoring and control system 100. For example, the controller 102, the communication device 120, and the I/O devices 122 may be contained within a common housing. The sensors 101 may be tethered to the housing via cables, allowing the sensors 101 to be mounted on or proximate to different components of the turbomachine 104. Alternatively, the sensors 101 may be untethered from the housing and wirelessly connected to the controller 102 via the communication device 120.

The controller 102 determines the condition of the turbomachine 104 by collecting sensor data during certain stages of operation of the turbomachine 104. For example, the controller 102 may collect sensor data by receiving sensor signals generated by the sensors 101. The controller 102 may receive temperature data generated by the one or more temperature sensors 116 and vibration data generated by the one or more vibration sensors 118. The sensor data that is received and analyzed by the controller 102 may be generated during certain stages of operation such as start-up, shutdown, and steady state operation. In an aircraft application, the steady state operation may occur while the aircraft is at a cruise flight stage of operation. The temperature and vibration parameters may provide an indication of the amount of energy received by the turbomachine 104 that is converted to thermal energy (e.g., heat) and vibrational kinetic energy, instead of being used as mechanical energy to rotate the rotor 106. For example, as the turbomachine 104 ages, the vibrations may increase in amplitude due to wear and fatigue of the components. These parameters may serve to provide a full sense of the turbomachinery condition.

In an example, one temperature sensor 116 may be located at the motor 108 to measure the temperature of the motor 108. Furthermore, one vibration sensor 118 may be located on or proximate to the rotor 106 to measure the vibration of the rotor 106. To be clear, the rotor 106 refers to the impeller or turbine of the turbomachine 104 which interacts with fluid flow. For example, the rotor 106 may be an impeller of a compressor that is driven by the motor 108 to compress air. The rotor 106 is not an internal component of the motor 108 (e.g., is not the rotor located within a stator of the inductive motor). The controller 102 may receive the sensor signals to monitor the temperature of the motor 108 and the vibration of the rotor 106 over time. The controller 102 may use a vibration signature of the rotor 106 generated by the vibration sensor 118 to differentiate between a new, fully functional turbomachine 104 and a used, degraded turbomachine 104. The vibration signature may represent the sensor signals generated by the vibration sensor 118 over a fixed period of time. The vibration signature may be affected by various components of the turbomachine 104, such as journal bearings, the motor 108, the rotor housing, and/or the like. The controller 102 may be designed to detect and investigate deteriorated vibration signatures of the turbomachine 104 internal components.

The temperature sensor 116 that measures the temperature of the motor 108 may be mounted on an outer surface of the motor housing. The temperature that is measured may represent an external motor temperature. In an example, the controller 102 may determine an internal motor temperature of the motor 108 based on the value of the external motor temperature measurement received from the temperature sensor 116. For example, the memory 114 of the controller 102 may store a correlation (e.g., a transfer function, look-up table, or the like) between the external motor temperature and an internal motor temperature. The controller 102 may input the value of the external motor temperature as measured by the temperature sensor 116 into the correlation to determine a predicted or estimated internal motor temperature value of the motor 108. The internal motor temperature may refer to the temperature of the stator. The value of the internal motor temperature may be estimated using the correlation to avoid interfering with the integrity of the internal motor components. Optionally, the monitoring and control system 100 may include one or more other temperature sensors 116 installed at different locations along the turbomachine 104. For example, a second temperature sensor 116 may be installed at the air outlet duct of the turbomachine 104 to measure a temperature of the air (e.g., compressed air) that exits the device. The locations of the temperature sensor(s) 116 may be selected based on proximity to primary and/or secondary failure modes of the turbomachine 104 and ease of access.

In an embodiment, the controller 102 may analyze the temperature data from the one or more temperature sensors 116 while the turbomachine 104 is at the steady state operation to determine the condition of the turbomachine 104. As such, the measured value of the external motor temperature and estimated value of the internal motor temperature may correspond to the steady state thermal condition of the motor 108. The motor temperature at the steady state thermal condition may provide greater insight into the condition of the turbomachine 104 than temperatures during start-up, shutdown, and/or other transient stages. The controller 102 may ignore or not request temperature data during transient stages of operation. In an embodiment, the controller 102 may analyze the vibration data from the one or more vibration sensors 118 while the turbomachine 104 is at a transient stage to determine the condition of the turbomachine 104. For example, the controller 102 may analyze the vibration data generated during start-up and/or shutdown of the turbomachine 104. If the internal components of the turbomachine 104 have suffered degradation, the vibration levels measured during start-up and other transient operating conditions may reflect a relatively unique vibration signature that can be used by the controller 102 to determine the condition of the turbomachine 104. In an example, the controller 102 may ignore or not request vibration data during steady state operation of the turbomachine 104. In this example, the controller 102 may determine the condition of the turbomachine 104 based on different parameters of the turbomachine 104 that are measured at different times and during different operational stages of the turbomachine 104. For example, the temperature data that is used by the controller 102 for the analysis may be generated during steady state, and the vibration data that is used by the controller 102 may be generated during at least one transient stage.

In an embodiment, the controller 102 determines baseline values of parameters based on the measured parameters of the specific turbomachine 104 generated over time. For example, the controller 102 may record the values of the temperature of the motor 108 over time in the memory 114. These historical temperature values may be generated by the same temperature sensor 116 at different days over a course of weeks, months, or even years of turbomachine operation. Similarly, the controller 102 may record the values (e.g., signatures) of the vibration of the rotor 106 over time in the memory 114. These historical vibration values may be generated by the same vibration sensor 118 at different days over a course of weeks, months, or even years of turbomachine operation. The controller 102 may use these historical parameters values as baseline values to which new sensor data is compared to determine the current condition of the turbomachine 104. The controller 102 may determine a trend line for the temperature data and/or the vibration data. The trend line may reflect the respective parameter values over time. Gradual shifting of the monitored parameters over time may be reflected in the trend lines. In this example, the determination of the condition of the turbomachine 104 may be based only on the recorded behavior of the specific turbomachine 104. The controller 102 may ignore data that is external to the specific turbomachine 104, such as data that is based on the behavior of other turbomachines 104 installed in different vehicles. Optionally, the controller 102 may consider mean time between failure (MTBF) values of the components of the turbomachine 104 in the determination of the baseline values, in addition to the historical monitored parameters.

The controller 102 may compare current parameter values of the turbomachine 104, based on recent sensor data of the sensors 101, to the baseline values to determine the condition of the turbomachine 104. For example, the controller 102 may compare the current parameter values of the turbomachine 104 to designated threshold values that represent the baseline values. In another example, the controller 102 may compare the current parameter values to respective trend lines of historical parameter values, where the trend lines represent the baseline values. The controller 102 may determine the condition based on an offset between the current parameter values and the baseline values. In another example, the controller 102 may determine the condition based on a comparison between the trend line and a threshold value or designated range.

In a first example, the controller 102 may determine the condition of the turbomachine 104 by comparing a value of a measured parameter (e.g., temperature or vibration) to a designated threshold value or a designated range. The designated threshold value and/or designated range may be stored in the memory 114. If the temperature of the motor 108 during steady state operation is below the designated threshold value or within the designated range, the controller 102 may determine that the turbomachine 104 has a healthy, fully-functional and non-degraded condition. Alternatively, the controller 102 may determine that the turbomachine 104 is degraded if the temperature value as measured is at or above the designated threshold value or outside of the designated range. The controller 102 may determine that the turbomachine 104 is healthy if both the temperature value and the vibration value are within respective designated ranges. The controller 102 may determine that the turbomachine 104 has a first degraded condition if the temperature value or the vibration value, but not both, is within the respective designated range, and the other value is outside of the respective designated range. The controller 102 may determine that the turbomachine 104 has a second degraded condition, which is more severe than the first degraded condition, in response to both the temperature value and the vibration value being outside of the respective designated ranges.

In a second example, the controller 102 may determine the condition of the turbomachine 104 by comparing the current parameter values to historical parameter data previously collected based on operation of the turbomachine 104. For example, the controller 102 may record the data collected during each monitoring session to a database. The database may be stored in the memory 114. The data may be aggregated over time to determine a trend of the parameter over time. The controller 102 may compare the values of the parameter collected during each new monitoring session to the historical trend data. The controller 102 may interpret a significant deviation (e.g., step change) in the parameter values compared to the historical data as a signal that the turbomachine 104 is degraded. Furthermore, the controller 102 may calculate a slope of the trend line in the historical data. If the slope of the trend line is greater than (or less than) a threshold slope, the controller 102 may flag the turbomachine 104 as degraded. Furthermore, the trend line may be used by the controller 102 to predict the remaining life of the turbomachine 104, or a component thereof. The controller 102 may use the most recent parameter values and the trend line to predict when the parameter values will reach a threshold value that is associated with failure and/or end of life.

In a third example, the controller 102 may compare a measured value of a first parameter that is monitored to an expected value of the first parameter to determine an offset. The expected value may be based on historical performance of the relevant component, a manufacturer rating, a message received from the vehicle control system, observed conditions, and/or the like. The controller 102 may determine the condition of the turbomachine 104 based on the offset. For example, a greater offset may indicate a greater extent of degradation.

In a fourth example, the controller 102 may perform vibration analysis on the vibration data received from the vibration sensor 118. The vibration data corresponds to the rotor 106. The controller 102 may perform the vibration analysis by isolating a designated frequency of interest (FOI) at the rotor 106 rotating speed. The FOI may refer to a specific frequency value or a narrow frequency range. The controller 102 may monitor a spectral magnitude. The spectral magnitude indicates the rotational energy of the rotor 106 at different frequencies. For example, the spectral magnitude may disclose how much energy is present in the rotor 106 at the FOI. For this analysis, the controller 102 may obtain vibration data generated by the vibration sensor 118 at the rotor 106. The vibration data may be raw waveform data. The controller 102 may analyze the frequency content and/or vibration signature of the raw waveform data. The controller 102 may select the FOI to monitor based on certain operating conditions of the rotor 106, such as the power to the turbomachine 104 and/or the rotational speed of the rotor 106. For example, if the impeller is rotating at a first speed, the controller 102 may select a first FOI to monitor. If the impeller is rotating at a second speed, the controller 102 may select a second FOI to monitor.

The controller 102 may analyze the raw waveform data from the vibration sensor 118 to determine the energy at the FOI that is selected. The controller 102 may then compare the current energy level at the FOI to a baseline value to determine the condition of the turbomachine 104. For example, if the energy level at the FOI is decreased relative to a prior measurement of the energy level at the FOI during a similar operating condition, the controller 102 may determine that the turbomachine 104 has a degraded condition. As the turbomachine 104 degrades over time, the mechanical connection of the rotor 106 to the housing and/or motor 108 may be looser (e.g., due to component wear and fatigue), so more of the energy may be dissipated as heat and vibrational kinetic energy and less of the energy may be used to rotate the rotor 106 at the FOI.

The controller 102 may determine the condition as one of multiple different values based on different metrics, scales, references, and/or the like. For example, the controller 102 may determine the condition as a binary value, such as either indicating a productive (e.g., healthy) state or a degraded state. The controller 102 may also determine a third option for when the turbomachine 104, or component thereof, has already failed and/or is non-functional. In an example, if the monitored parameter value is at or above the designated baseline value or within a designated baseline range, then the controller 102 may determine that the turbomachine 104 is productive. On the other hand, the controller 102 may determine that the turbomachine 104 is degraded if the monitored parameter value is below the designated baseline value or outside of the designated baseline range. In another example, the condition may be determined as a value along a scale, such as 1 to 10 or a percentage value.

In an example, the controller 102 may determine the predicted remaining life of the turbomachine 104 based on the condition that is determined. For example, the predicted remaining life may be based on an extent of offset between values of the monitored parameters and the baseline values. The level of offset may be tiered with multiple designated threshold values stored in the memory 114. Depending on which range a measured offset fall within, the controller 102 may determine the predicted remaining life of the turbomachine 104. For example, the controller 102 may provide the predicted remaining life in a 4-tiered arrangement, indicating 100% or full life remaining, 75% life remaining, 50% life remaining, and 25% life remaining.

The controller 102 may determine a number of days, months, years, operational cycles, and/or the like to represent the predicted remaining life of the turbomachine 104. For example, if the controller 102 determines that the condition of the turbomachine 104, or component thereof, is at 50% health, meaning 50% operating life remaining, then the controller 102 may multiply the current operating life span of the turbomachine 104, or component thereof, by two to estimate the predicted remaining life. The expected operational life span may be provided by the manufacturer, such as a MTBF value. In another example, the controller 102 may determine the predicted remaining life of the turbomachine 104 based on the trend line or other trend data that is a function of recorded historical parameter values of the turbomachine 104. For example, the controller 102 may use the trend line of motor temperature over time to determine when an average motor temperature of the motor 108 at steady state is predicted to reach a threshold value associated with failure or an elevated risk of failure due to the degradation of the turbomachine 104, or component thereof. The controller 102 may determine the predicted remaining life to be the amount of time or cycles from now until the time that the monitored parameter value is predicted to reach the threshold value according to the trend line.

The controller 102 may be implemented in a prognostic model to predict turbomachinery failures prior to the failures occurring. The controller 102 may collect data from the sensors 101 for an extended period of time. The controller 102 may have a machine learning algorithm, and may utilize the machine learning to create a prognostic tool based on the collected data.

In an embodiment, after determining the condition of the turbomachine 104, the controller 102 may adjust operating performance of the turbomachine 104 based on the condition. For example, as long as the condition indicates that the turbomachine 104 is functional and not at risk of imminent failure, the controller 102 may adjust one or more settings of the turbomachine 104 based on the condition while maintaining operation of the turbomachine 104. As an example, if the controller 102 determines that the turbomachine 104 is further degraded than a previous analysis of the turbomachine 104, although still functional, the controller 102 may select one or more different control settings for operating the turbomachine 104 to adjust performance of the turbomachine 104. In an example, the controller 102 may select the different control settings to compensate for the additional degradation and maintain a similar level of performance of the turbomachine 104. The controller 102 may select the adjusted control settings based on the value of the newly-determined condition and/or the offset between a performance level of the turbomachine 104 when new and a current, degraded performance level of the turbomachine 104. In an example, the controller 102 may adjust the control settings by altering the positions of the diffuser vanes 112, the power to the turbomachine 104, the torque output of the motor 108, and/or positions of valves that control fluid flow through the turbomachine 104.

Some known systems may control a turbomachine in the same way (e.g., using the same control settings) throughout the operational life of the turbomachine, even as it ages and the components degrade. Thus, even as the turbomachine degrades over time, the known systems may continue to control the degraded turbomachine as if it is a new, non-degraded turbomachine. The known systems may still command the degraded turbomachine to the same performance curve that is intended for new turbomachines. The monitoring and control system 100, however, may adjust the operation of the turbomachine 104 over time to account for the degradation.

In an example, the controller 102 may change a performance curve along which the turbomachine 104 is operated based on the determined condition of the turbomachine 104. The performance curve may include constant speed lines, pressure ratios, and mass flow rates, and relationships between these parameters. For example, a performance curve may depict how the pressure ratio changes relative to the mass flow rate along a first constant speed line, and how the pressure ratio changes relative to the mass flow rate along a different, second constant speed line. The speed lines may refer to different speeds of the rotor 106 as driven by the motor 108. In an example, in response to determining that the turbomachine 104 has a first condition, the controller 102 may select a first performance curve for operating the turbomachine 104. In response to subsequently determining that the turbomachine 104 has a second condition, the controller 102 may select a second performance curve for operating the turbomachine 104. The second condition of the turbomachine 104 may be more degraded than the first condition. For example, the controller 102 may use the first performance curve in response to determining that the turbomachine 104 has 100% health, and may use the second performance curve in response to determining that the turbomachine 104 has 50% health. The second performance curve may require more power from the power source that powers the motor 108 relative to the first performance curve. For example, due to degradation, the turbomachine 104 may require more input power to achieve similar performance as a new turbomachine 104. Additional power may be needed to achieve a designated flow rate of compressed air at a designated pressure when the turbomachine 104 is degraded. In another example, instead of switching performance curves, the controller 102 may shift or adjust the performance curve in response to determining that the condition of the turbomachine 104 has changed. For example, the controller 102 may modify the performance curve by adjusting the relationships between the constant speed lines, the mass flow rate, and the pressure ratio. Optionally, the performance curves may be specific to the turbomachine 104.

In another example, the controller 102 may generate control signals to move the diffuser vanes 112 based on the condition of the turbomachine 104 that is determined. The diffuser vanes 112 may control the angle at which air flowing through the turbomachine 104 exits a compressor portion of the turbomachine 104. The diffuser vanes 112 may be moved by an actuator that is controlled by the control signals received from the controller 102. As the turbomachine 104 ages, components that affect the movement of the diffuser vanes 112, such as bushings, may wear and/or loosen, which can cause slack in the movement of the diffuser vanes 112. The result is that the diffuser canes 112 may not achieve the same positioning over time, even when commanded by the controller 102 to move to the same position. This slack may be reflected in the vibration signature. In an example, the controller 102 may analyze the temperature data and vibration data generated by the sensors 116, 118, and may determine that the turbomachine 104 is at 75% health. When the turbomachine 104 was at 100% health, the controller 102 may control the actuator to open the diffuser vanes 112 to a first position. The first position may be 20% open. Now that the condition has dipped to 75% health, the controller 102 may control the actuator to open the diffuser vanes 112 to a second position to compensate for the slack in the diffuser vanes 112. In an example, the second position may be 25% open. The controller 102 may command that the diffuser vanes 112 be opened to a slightly greater extent, due to the degradation, in order to effectively achieve the same performance of the turbomachine 104. For example, the controller 102 may command the diffuser vanes 112 to 25% open in an attempt to compensate for the slack that is present and actually cause the diffuser vanes 112 to achieve the 20% open position. Thus, the controller 102 may adjust the positioning of the diffuser vanes 112, as the condition of the turbomachine 104 degrades, in an attempt to maintain the same or a similar level of performance of the turbomachine 104. The controller 102 may command that the diffuser vanes 112 be moved to a greater extent that actually desired, knowing that slack and other component wear will restrict the diffuser vanes 112 from actually achieving movement to the commanded position.

In another example, the controller 102 may modify power to the motor 108 based on the condition of the turbomachine 104. For example, the controller 102 may generate control signals that are communicated to the switch devices 110, which control the power from the power source to the motor 108. As the turbomachine 104 degrades over time, the percentage of received energy that is used to power rotation of the rotor 106 may decrease. Component wear and fatigue may cause a greater percentage of the received energy to be wasted as heat, vibration, noise, and/or the like. In an example, the controller 102 may increase the electrical power supplied to the motor 108 in response to determining that the condition of the turbomachine 104 has degraded. The controller 102 in another example may change the rotational speed of the rotor 106 based on the condition of the turbomachine 104. For example, the controller 102 may compensate for increased slack, eccentricity of the rotor 106, and/or the like, by controlling the motor 108 to increase the rotational speed of the rotor 106. The controller 102 may increase the commanded rotational speed proportionate to the amount of degradation of the turbomachine 104 for effectively maintaining the performance of the turbomachine 104 over time.

In these examples, the amount by which the controller 102 may command the diffuser vanes 112 to move, the amount of additional electrical power to be supplied to the motor 108, the increased speed of the rotor 106, and/or the like may be determined by the controller 102 based on stored relationships between the determined condition and the responsive control action. For example, the memory 114 may include a look-up table that provides a relationship between the condition of the turbomachine 104 and the amount of power to supply the motor 108. Furthermore, a second look-up table in the memory 114 may provide a relationship between the condition of the turbomachine 104 and actuated positions of the diffuser vanes 112, and a third look-up table may provide a relationship between the condition of the turbomachine 104 and commanded rotational speeds of the rotor 106. The controller 102 may input the determined condition of the turbomachine 104 into the corresponding look-up tables to determine the appropriate control actions.

The controller 102 may notify an operator of the vehicle about the determined condition of the turbomachine 104. For example, the controller 102 may generate a notification message that is communicated to the operator prior to the start of a trip of the vehicle. In an aircraft application, the notification message may be communicated to the pilot prior to the start of a flight. The notification message includes the condition of the turbomachine 104. The notification message optionally includes additional information, such as the predicted amount of remaining life of the turbomachine 104, or components thereof. The notification message may be communicated to a vehicle control system and/or directly to a display device for presentation of the information contained in the notification message on the display device. Optionally, the notification message may be communicated to a personal computing device (e.g., smartphone, tablet computer, smartwatch, or the like) of the operator.

In an example, the controller 102 may take one or more remedial actions onboard the vehicle based on the determined condition of the turbomachine 104. For example, in response to determining that the turbomachine 104 has a degraded condition, the controller 102 may control the vehicle and/or other systems onboard the vehicle (other than the turbomachine 104) in an attempt to reduce the rate of degradation of the turbomachine 104 and extend the operational life of the turbomachine 104, limit collateral damage, and avoid canceling a planned trip of the vehicle. The remedial actions may be stored as program instructions in the memory 114. The controller 102 may determine the remedial action to take based on the specific component(s) determined to be degraded, the determined extent of degradation, and remedial options onboard the vehicle. The monitoring and control system 100 may have several different failure modes. Some failure modes may be offsettable, which means the vehicle and/or turbomachine 104 may still operate after determining the failure mode, albeit in a restricted operation. Other failure modes may be absolute, forcing the controller 102 to immediately cease turbomachine 104 operation and/or vehicle operation, until maintenance is performed.

For example, in response to the controller 102 determining that the turbomachine 104 has a degraded condition, the controller 102 may implement a restricted mode. In the restricted mode, the controller 102 may operate the motor 108 and/or rotor 106 at a reduced speed to reduce the load on the turbomachine 104. In another example in which the turbomachine 104 is a compressor, the controller 102 may recommend operating the vehicle in a restricted mode that consumes less compressed air than if the turbomachine 104 was not degraded. In another example, the controller 102 may enlist a different source of compressed air onboard the vehicle to provide compressed air to partially or completely offset the compressed air generated by the degraded turbomachine 104. Furthermore, the controller 102 may automatically notify the operator in response to detecting that the turbomachine 104 is degraded or has failed. In another example, the controller 102 may automatically schedule maintenance for the turbomachine 104 in response to detecting that it is degraded or has failed.

Figure 2:
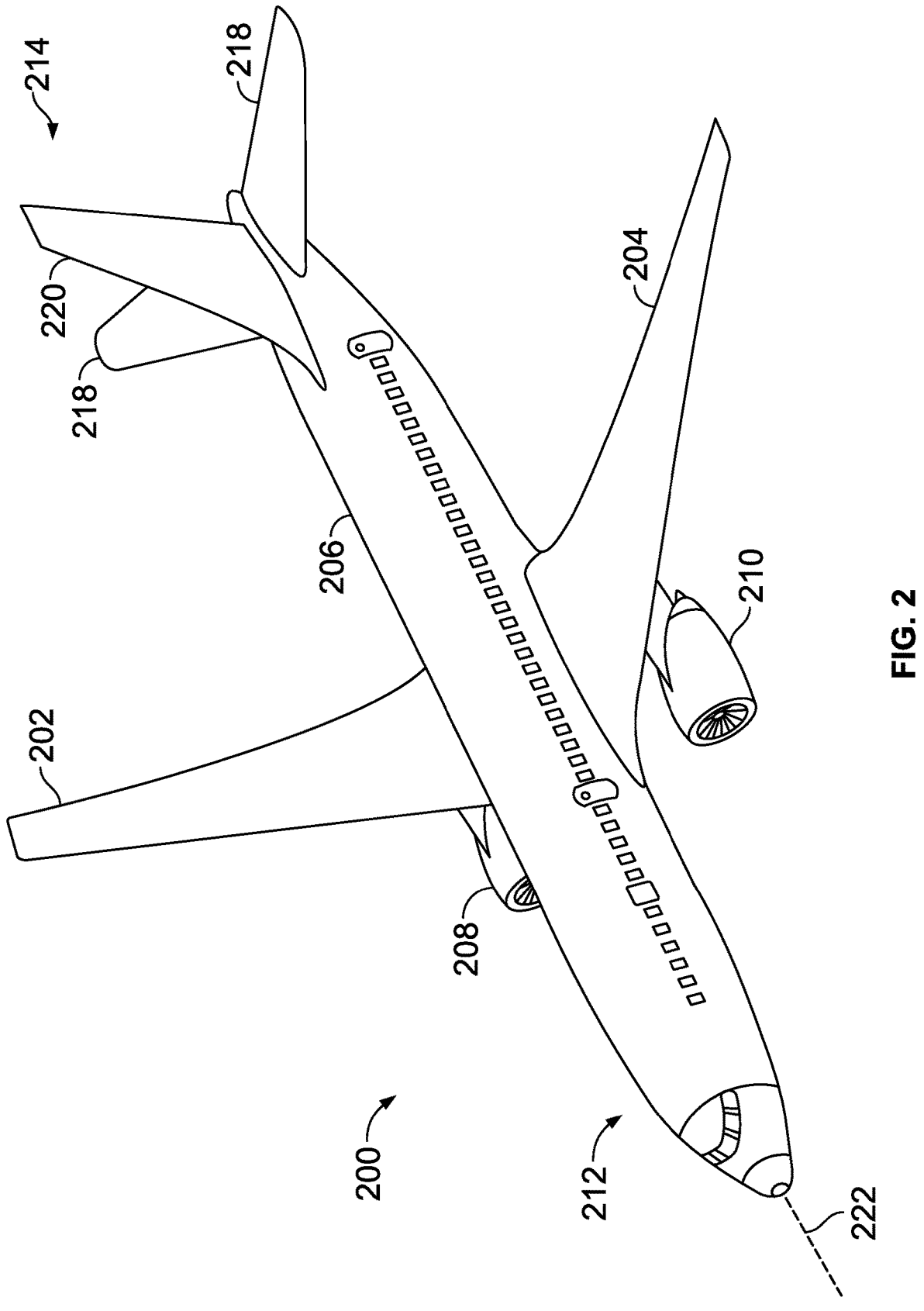
FIG. 2 is a perspective illustration of an aircraft.

FIG. 2 is a perspective illustration of an aircraft 200. In an embodiment, the aircraft 200 represents the vehicle on which the turbomachine 104 is installed. For example, the monitoring and control system 100 may be implemented onboard the aircraft 200 to determine a condition of the turbomachine 104. The aircraft 200 includes a fuselage 206 extending from a nose section 212 to an empennage 214 or tail section. The aircraft 200 includes a pair of wings 202, 204 extending from the fuselage 206. The wings 202, 204 may include movable wing surfaces, such as ailerons, flaps, and/or spoilers. One or more propulsion systems 208, 210 propel the aircraft 200. The propulsion systems 208, 210 are supported by the wings 202, 204 of the aircraft 200 in the illustrated embodiment, but may be mounted to the fuselage 206 or empennage 214 in other types of aircraft. The empennage 214 may include horizontal stabilizers 216, 218 and a vertical stabilizer 220. The fuselage 206 defines multiple sections or cabins along the length of the fuselage 206 from the nose section 212 to the empennage 214. The fuselage 206 is oriented about a longitudinal axis 222. In an embodiment, the turbomachine 104 may be a CAC that is part of an environmental control system for regulating the temperature, humidity, and pressure of air supplied into the cabins of the fuselage 206.

FIG. 3 is a flow chart 300 of a method of monitoring and controlling a turbomachine according to an embodiment. The turbomachine that is monitored and controlled may be the turbomachine 104 described herein. The method may be performed in whole or in part by the controller 102 of the monitoring and control system 100. The method optionally may include additional steps, fewer steps, and/or different steps than the steps shown in the flow chart 300, and/or one or more of the steps may be performed in a different sequence than illustrated and described herein.

At step 302, temperature data generated by a temperature sensor 116 is obtained. The temperature data indicates a measured temperature of the turbomachine 104 disposed onboard a vehicle. The temperature data may indicate the temperature of a motor 108 that drives rotation of a rotor 106 (e.g., impeller). The temperature data may be current (e.g., generated within a designated period from the present time) and may be generated while the turbomachine 104 is in a steady state operational condition. For example, obtaining the temperature data may refer to obtaining only temperature data that is generated by the temperature sensor 116 while the turbomachine 104 is at a steady state operational stage.

At step 304, vibration data generated by a vibration sensor 118 is obtained. The vibration data indicates measured vibration of the turbomachine 104. The vibration data may indicate the vibration level of the rotor 106. The vibration data may be current and may be generated while the turbomachine 104 is in a transient operational condition, such as during start-up and/or shutdown of the turbomachine 104. For example, obtaining the vibration data may refer to obtaining only vibration data that is generated by the vibration sensor 118 while the turbomachine 104 is at a transient operational stage.

At step 306, a health condition of the turbomachine 104 is determined based on an analysis of the temperature data and the vibration data.

At step 308, one or more operating settings of the turbomachine 104 are adjusted based on the health condition indicating that the turbomachine 104 is degraded. The one or more operating settings are adjusted to maintain a desired level of performance of the turbomachine 104.

Optionally, responsive to determining the health condition of the turbomachine 104, the method may include at least one of (i) modifying a performance curve that is used to control operation of the turbomachine 104 based on the health condition, where the performance curve includes constant speed lines, mass flow rates, and pressure ratios, (ii) modifying a commanded position of diffuser vanes 112 of the turbomachine 104 based on the health condition, or (iii) increasing electrical power supplied to an electric motor 108 of the turbomachine 104 based on the health condition.

Optionally, the vibration data generated by the vibration sensor 118 includes raw waveform data. The method may include determining a current energy level at a frequency of interest based on an analysis of the raw waveform data, and comparing the current energy level at the frequency of interest to a baseline energy value to determine the health condition of the turbomachine 104.

Figure 4:
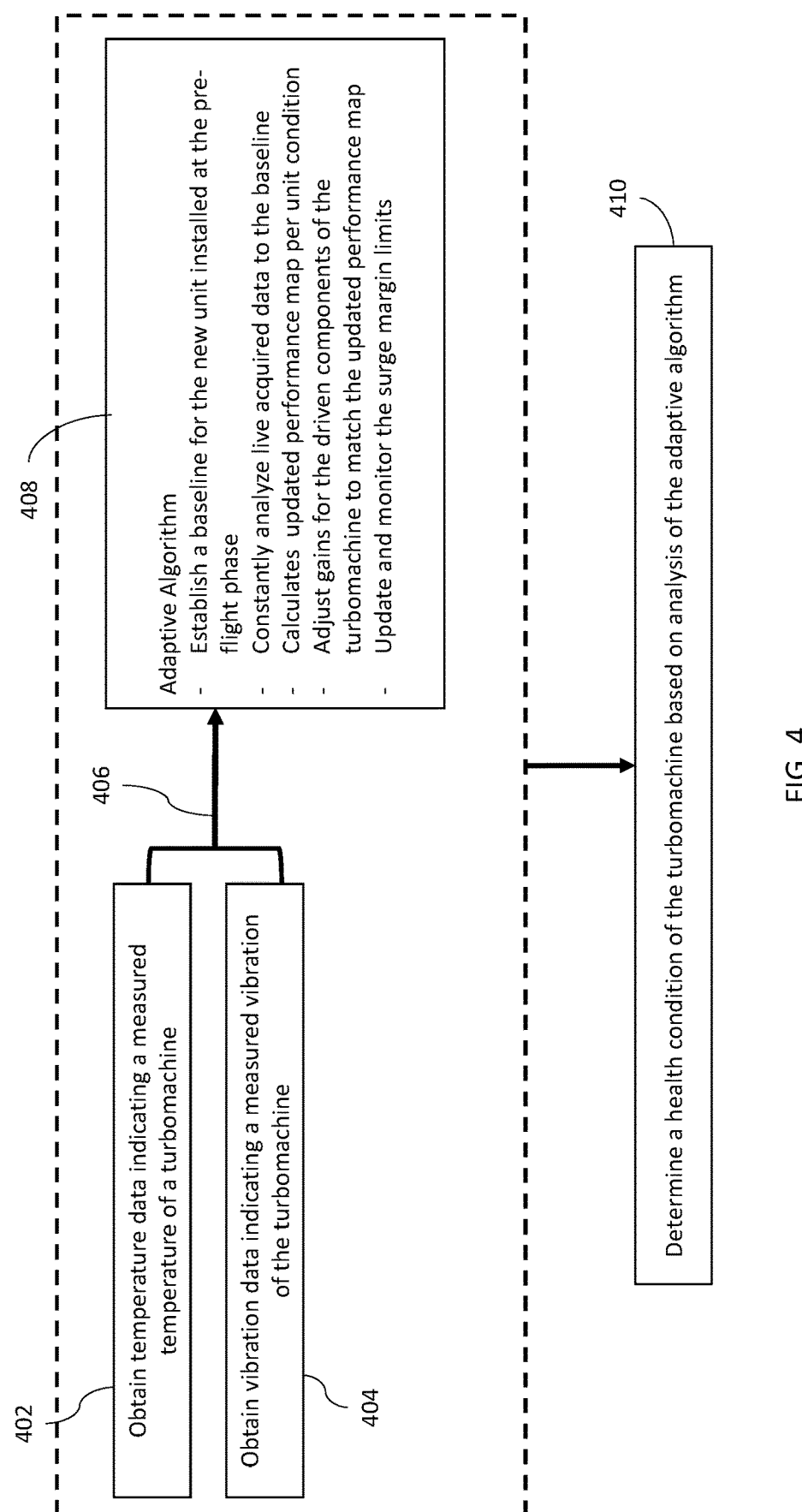
FIG. 4 is a flow chart of a method of monitoring and determining a health condition of a turbomachine according to an embodiment.

FIG. 4 is a flow chart 400 of a method of monitoring and determining a health condition of a turbomachine according to an embodiment. The turbomachine that is monitored and controlled may be the turbomachine 104 described herein. The method may be performed in whole or in part by the controller 102 of the monitoring and control system 100. The method optionally may include additional steps, fewer steps, and/or different steps than the steps shown in the flow chart 400, and/or one or more of the steps may be performed in a different sequence than illustrated and described herein.

At step 402, temperature data is obtained that indicates a measured temperature of the turbomachine. At step 404, vibration data is obtained that indicates a measured vibration of the turbomachine.

At step 406, the temperature data and the vibration data is input into an adaptive algorithm 408. The following sub-steps may be performed by the controller 102 by implementing the adaptive algorithm 408. Alternatively, the following sub-steps may be performed by a different controller (e.g., one or more processors) that is communicatively connected to the controller 102 and implements the adaptive algorithm 408. The first sub-step of the adaptive algorithm 408 may be to establish a baseline (e.g., value, range, threshold, etc.) for the new turbomachine unit that is installed. The baseline may be established during a pre-flight operating phase. The second sub-step may involve receiving and comparing updated temperature and vibration data to the baseline over time. Based on the comparison of the updated temperature and vibration data to the baseline, the adaptive algorithm 408 may calculate an updated performance map that is specific to the particular turbomachine unit and based on the condition of the turbomachine. The next sub-step may include adjusting gains for the driven components of the turbomachine to match the updated performance map. Afterwards, the adaptive algorithm 408 may update and monitor surge margin limits.

After the adaptive algorithm 408 is performed, the controller 102 at step 410 may determine a health condition of the turbomachine based on an analysis of the adaptive algorithm 408.

Further, the disclosure comprises examples according to the following clauses:

Clause 1. A monitoring and control system comprising:
  a temperature sensor configured to measure temperature of a turbomachine disposed onboard a vehicle;
  a vibration sensor configured to measure vibration of the turbomachine; and
  a controller including one or more processors, wherein the controller is configured to receive and analyze temperature data generated by the temperature sensor and vibration data generated by the vibration sensor, and wherein the controller is further configured to determine a health condition of the turbomachine based on the analysis.

Clause 2. The monitoring and control system of Clause 1, wherein the controller is further configured to determine a predicted remaining life of the turbomachine based on the health condition that is determined.

Clause 3. The monitoring and control system of Clause 1 or Clause 2, wherein the turbomachine includes a rotor that is driven by an electric motor, and wherein the temperature sensor is configured to measure the temperature of the electric motor.

Clause 4. The monitoring and control system of Clause 3, wherein the vibration sensor is configured to measure the vibration of the rotor.

Clause 5. The monitoring and control system of Clause 4, wherein the controller is configured to analyze the temperature data that is generated by the temperature sensor while the turbomachine is at a steady state operational stage, and wherein the controller is configured to analyze the vibration data that is generated by the vibration sensor while the turbomachine is at a transient operational stage.

Clause 6. The monitoring and control system of any of Clauses 1-5, wherein the controller is further configured to adjust one or more operating settings of the turbomachine based on the health condition indicating that the turbomachine is degraded, and wherein the controller is further configured to adjust the one or more operating settings to maintain a desired level of performance of the turbomachine.

Clause 7. The monitoring and control system of Clause 6, wherein the controller is configured to adjust the one or more operating settings to an extent proportional to a level of degradation of the turbomachine.

Clause 8. The monitoring and control system of any of Clauses 1-7, wherein the controller is further configured to modify a performance curve that is used to control operation of the turbomachine based on the health condition that is determined, and wherein the performance curve includes constant speed lines, mass flow rates, and pressure ratios.

Clause 9. The monitoring and control system of any of Clauses 1-8, wherein the controller is further configured to modify a commanded position of diffuser vanes of the turbomachine based on the health condition that is determined.

Clause 10. The monitoring and control system of any of Clauses 1-9, wherein the turbomachine includes a rotor that is driven by an electric motor, and wherein the controller is further configured to increase electrical power supplied to the electric motor based on the health condition indicating that the turbomachine is degraded.

Clause 11. The monitoring and control system of any of Clauses 1-10, wherein responsive to the health condition indicating that the turbomachine is degraded, the controller is further configured to restrict operation of at least one of the turbomachine or the vehicle during a trip.

Clause 12. The monitoring and control system of any of Clauses 1-11, wherein the controller is configured to determine the health condition of the turbomachine by one or both of (i) comparing a temperature value of the temperature data to a designated temperature range and comparing a vibration value of the vibration data to a designated vibration range or (ii) comparing the temperature value to historical temperature data of the turbomachine generated by the temperature sensor and comparing the vibration value to historical vibration data of the turbomachine generated by the vibration sensor.

Clause 13. The monitoring and control system of any of Clauses 1-12, wherein the vibration data generated by the vibration sensor includes raw waveform data, wherein the controller is further configured to analyze the raw waveform data and determine a current energy level at a frequency of interest, and wherein the controller is further configured to compare the current energy level at the frequency of interest to a baseline energy value to determine the health condition of the turbomachine.

Clause 14. The monitoring and control system of any of Clauses 1-13, wherein the turbomachine is a compressor configured to compress air for at least one of pressurization or air conditioning within a cabin of the vehicle.

Clause 15. A method comprising:
  obtaining temperature data generated by a temperature sensor indicating a measured temperature of a turbomachine disposed onboard a vehicle;
  obtaining vibration data generated by a vibration sensor indicating a measured vibration of the turbomachine; and
  determining a health condition of the turbomachine based on an analysis of the temperature data and the vibration data.

Clause 16. The method of Clause 15, wherein said obtaining the temperature data comprises obtaining only temperature data that is generated by the temperature sensor while the turbomachine is at a steady state operational stage, and wherein said obtaining the vibration data comprises obtaining only vibration data that is generated by the vibration sensor while the turbomachine is at a transient operational stage.

Clause 17. The method of Clause 15 or Clause 16, further comprising adjusting one or more operating settings of the turbomachine based on the health condition indicating that the turbomachine is degraded, wherein the one or more operating settings are adjusted to maintain a desired level of performance of the turbomachine.

Clause 18. The method of any of Clauses 15-17, wherein the vibration data generated by the vibration sensor includes raw waveform data, and the method further includes:

determining a current energy level at a frequency of interest based on an analysis of the raw waveform data; and comparing the current energy level at the frequency of interest to a baseline energy value to determine the health condition of the turbomachine.

Clause 19. The method of any of Clauses 15-18, wherein, responsive to determining the health condition of the turbomachine, the method further comprises one or more of:

modifying a performance curve that is used to control operation of the turbomachine based on the health condition, wherein the performance curve includes constant speed lines, mass flow rates, and pressure ratios;

modifying a commanded position of diffuser vanes of the turbomachine based on the health condition; or increasing electrical power supplied to an electric motor of the turbomachine based on the health condition.

Clause 20. An aircraft comprising:

a turbomachine installed onboard the aircraft, wherein the turbomachine includes a rotor that is configured to compress air and an electric motor that is configured to drive rotation of the rotor; and a monitoring and control system disposed onboard the aircraft, wherein the monitoring and control system comprises:

a temperature sensor configured to measure temperature of a turbomachine disposed onboard a vehicle;

a vibration sensor configured to measure vibration of the turbomachine; and a controller including one or more processors, wherein the controller is configured to receive and analyze temperature data generated by the temperature sensor and vibration data generated by the vibration sensor, and wherein the controller is further configured to determine a health condition of the turbomachine based on the analysis.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

The controller 102 of the monitoring and control system 100 described herein includes one or more processors 103. In an example in which the controller 102 has multiple processors 103, these processors 103 may be located in the same housing or enclosure (e.g., in the same device) or may be distributed among or between two or more housings or enclosures (e.g., in different devices). The multiple processors 103 in the same or different devices may share performance of the functions described herein. For example, different processors 103 may perform different sets or groups of the functions described herein.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A monitoring and control system comprising:

a temperature sensor configured to measure temperature of a turbomachine disposed onboard a vehicle;

a vibration sensor configured to measure vibration of the turbomachine; and a controller including one or more processors, wherein the controller is configured to receive and analyze temperature data generated by the temperature sensor and vibration data generated by the vibration sensor, wherein the controller is further configured to determine a health condition of the turbomachine based on the analysis, wherein the vibration data generated by the vibration sensor includes raw waveform data, wherein the controller is further configured to analyze the raw waveform data and determine a current energy level at a frequency of interest, and wherein the controller is further configured to compare the current energy level at the frequency of interest to a baseline energy value to determine the health condition of the turbomachine.

2. The monitoring and control system of claim 1, wherein the controller is further configured to determine a predicted remaining life of the turbomachine based on the health condition that is determined.

3. The monitoring and control system of claim 1, wherein the turbomachine includes a rotor that is driven by an electric motor, and wherein the temperature sensor is configured to measure the temperature of the electric motor.

4. The monitoring and control system of claim 3, wherein the vibration sensor is configured to measure the vibration of the rotor.

5. The monitoring and control system of claim 4, wherein the controller is configured to analyze the temperature data that is generated by the temperature sensor while the turbomachine is at a steady state operational stage, and wherein the controller is configured to analyze the vibration data that is generated by the vibration sensor while the turbomachine is at a transient operational stage.

6. The monitoring and control system of claim 1, wherein the controller is further configured to adjust one or more operating settings of the turbomachine based on the health condition indicating that the turbomachine is degraded, and wherein the controller is further configured to adjust the one or more operating settings to maintain a desired level of performance of the turbomachine.

7. The monitoring and control system of claim 6, wherein the controller is configured to adjust the one or more operating settings in relation to a level of degradation of the turbomachine.

8. The monitoring and control system of claim 1, wherein the controller is further configured to modify a performance curve that is used to control operation of the turbomachine based on the health condition that is determined, and wherein the performance curve includes constant speed lines, mass flow rates, and pressure ratios.

9. The monitoring and control system of claim 1, wherein the controller is further configured to modify a commanded position of diffuser vanes of the turbomachine based on the health condition that is determined.

10. The monitoring and control system of claim 1, wherein the turbomachine includes a rotor that is driven by an electric motor, and wherein the controller is further configured to increase electrical power supplied to the electric motor based on the health condition indicating that the turbomachine is degraded.

11. The monitoring and control system of claim 1, wherein responsive to the health condition indicating that the turbomachine is degraded, the controller is further configured to restrict operation of at least one of the turbomachine or the vehicle during a trip.

12. The monitoring and control system of claim 1, wherein the controller is configured to determine the health condition of the turbomachine by one or both of (i) comparing a temperature value of the temperature data to a designated temperature range and comparing a vibration value of the vibration data to a designated vibration range or (ii) comparing the temperature value to historical temperature data of the turbomachine generated by the temperature sensor and comparing the vibration value to historical vibration data of the turbomachine generated by the vibration sensor.

13. The monitoring and control system of claim 1, wherein the turbomachine is a compressor configured to compress air for at least one of pressurization or air conditioning within a cabin of the vehicle.

14. A method comprising:
obtaining temperature data generated by a temperature sensor indicating a measured temperature of a turbomachine disposed onboard a vehicle;
obtaining vibration data generated by a vibration sensor indicating a measured vibration of the turbomachine; and
determining a health condition of the turbomachine based on an analysis of the temperature data and the vibration data,
wherein, responsive to determining the health condition of the turbomachine, the method further comprises one or more of:
modifying a performance curve that is used to control operation of the turbomachine based on the health condition, wherein the performance curve includes constant speed lines, mass flow rates, and pressure ratios;
modifying a commanded position of diffuser vanes of the turbomachine based on the health condition; or
increasing electrical power supplied to an electric motor of the turbomachine based on the health condition.

15. The method of claim 14, wherein said obtaining the temperature data comprises obtaining only temperature data that is generated by the temperature sensor while the turbomachine is at a steady state operational stage, and wherein said obtaining the vibration data comprises obtaining only vibration data that is generated by the vibration sensor while the turbomachine is at a transient operational stage.

16. The method of claim 14, further comprising adjusting one or more operating settings of the turbomachine based on the health condition indicating that the turbomachine is degraded, wherein the one or more operating settings are adjusted to maintain a desired level of performance of the turbomachine.

17. The method of claim 14, wherein the vibration data generated by the vibration sensor includes raw waveform data, and the method further includes:
determining a current energy level at a frequency of interest based on an analysis of the raw waveform data; and
comparing the current energy level at the frequency of interest to a baseline energy value to determine the health condition of the turbomachine.

18. An aircraft comprising:
a turbomachine installed onboard the aircraft, wherein the turbomachine includes a rotor that is configured to compress air and an electric motor that is configured to drive rotation of the rotor; and
a monitoring and control system disposed onboard the aircraft, wherein the monitoring and control system comprises:
a temperature sensor configured to measure temperature of a turbomachine disposed onboard a vehicle;
a vibration sensor configured to measure vibration of the turbomachine; and
a controller including one or more processors, wherein the controller is configured to:

receive and analyze temperature data generated by the temperature sensor and vibration data generated by the vibration sensor, determine a health condition of the turbomachine based on the analysis, in response to determining the health condition of the turbomachine, one or more of: (a) modify a performance curve that is used to control operation of the turbomachine based on the health condition, wherein the performance curve includes constant speed lines, mass flow rates, and pressure ratios, (b) modify a commanded position of diffuser vanes of the turbomachine based on the health condition, or (c) increase electrical power supplied to an electric motor of the turbomachine based on the health condition.

19. The aircraft of claim 18, wherein the vibration data generated by the vibration sensor includes raw waveform data, wherein the controller is further configured to analyze the raw waveform data and determine a current energy level at a frequency of interest, and wherein the controller is further configured to compare the current energy level at the frequency of interest to a baseline energy value to determine the health condition of the turbomachine.

20. A method comprising:

obtaining temperature data generated by a temperature sensor indicating a measured temperature of a turbomachine disposed onboard a vehicle;

obtaining vibration data generated by a vibration sensor indicating a measured vibration of the turbomachine, wherein the vibration data generated by the vibration sensor includes raw waveform data;

determining a current energy level at a frequency of interest based on an analysis of the raw waveform data; and comparing the current energy level at the frequency of interest to a baseline energy value to determine the health condition of the turbomachine.

* * * * *